United States Patent [19]

Choy

[11] Patent Number: 4,997,304

[45] Date of Patent: Mar. 5, 1991

[54] CONNECTOR

[76] Inventor: Yau K. Choy, Room 13, 19th Floor, Block A, kornhill Garden, 29 Hong Shing Road, Hong Kong, Hong Kong

[21] Appl. No.: 349,746

[22] Filed: May 9, 1989

[51] Int. Cl.⁵ .............................................. B25G 3/00
[52] U.S. Cl. ....................................... 403/8; 403/297; 403/295; 403/171
[58] Field of Search ...................... 403/297, 295, 7, 8, 403/171, 173, 176

[56] References Cited

U.S. PATENT DOCUMENTS

| 2,214,177 | 9/1940 | Raybould | 403/297 |
| 2,881,018 | 4/1959 | Carlson et al. | 403/180 |
| 4,068,957 | 1/1978 | Brems et al. | 403/8 |
| 4,294,560 | 10/1981 | Larkin | 403/104 |
| 4,756,639 | 7/1988 | Hoshino | 403/297 |

FOREIGN PATENT DOCUMENTS

| 2902307 | 7/1980 | Fed. Rep. of Germany | 403/171 |
| 262752 | 5/1970 | U.S.S.R. | 403/295 |
| 1003469 | 9/1961 | United Kingdom . | |
| 1198927 | 3/1969 | United Kingdom . | |
| 1278337 | 12/1969 | United Kingdom . | |
| 1288543 | 1/1970 | United Kingdom . | |
| 1366077 | 10/1970 | United Kingdom . | |
| 1326132 | 6/1971 | United Kingdom . | |

Primary Examiner—Andrew V. Kundrat
Attorney, Agent, or Firm—Shlesinger & Myers

[57] ABSTRACT

There is disclosed a method of connecting tubes using a connector which comprises a body 41, through which is positioned a screw 43 having a head 44 and a threaded stem 45. A resiliently deformable member 413 is positioned on the threaded stem and a washer 46 is positioned on the threaded stem 45 the opposite side of the resiliently deformable member 413 from the body 41. A second washer 412 is positioned between the resiliently deformable member 413 and the body 41. In the method of the present invention the connector is inserted into a tube and a screwdriver is inserted into a groove in the head 44 of the screw 43. The screw 43 is thus rotated so that the washer 46 is threaded along the threaded stem 45 towards the body 41, thus compressing the resiliently deformable member 413 so that the resiliently deformable member 413 bulges outwardly and thus establishes a friction grip on the inner surface of the tube, thus securing the connector in relation to the tube.

12 Claims, 3 Drawing Sheets

CONNECTOR

DESCRIPTION OF INVENTION

The present invention relates to a method of connecting tubes and more particularly to a method of releasably connecting tubes from which tubes may be assembled items of furniture.

Furniture, is commonly assembled using a tubular framework. Various methods exist to connect the tubes of the framework together, often with use of connectors. Such connectors may be divided into two types, those that connect the tubes externally and those that connect the tubes internally.

Of the connectors that connect tubes externally, two major types exist. The first, known as octopus connectors, possess a main body from which extend pairs of "fingers", which fit around the tubes to be connected. Often one of the fingers contains a threaded hole therethrough, in which hole a screw is positioned, the screw being screwable into the hole so as to force a tube positioned between the two projections, against the opposite finger so as to hold the tube in place. Such octopus connectors, while releasable, are by their very nature comparatively bulky and tend to extend beyond the frame of the furniture thus marring the appearance of the furniture and providing the furniture with projections which are potentially dangerous and destabilizing. Furthermore, those octopus connectors with screw holes through the fingers necessarily require threaded holes to be machined within the fingers, which machining is a task requiring precision and taking up some time.

The other common type of external tube connector is the waterpipe connector. This type of connector comprises a tube, with an internal diameter slightly larger than the external diameter of the tubes to be connected. The internal surface of the connector has a female screw-thread which may be threaded onto male screw threads positioned on the external surface of the tubes to be connected. Whilst this connector is releasable, it tends to mar the overall appearance of the furniture and, furthermore, requires special tooling of the connector to provide the female thread on the inner surface. Additionally, this waterpipe connector may only be used with tubes which are specially tooled to correspond thereto by having male screw-threads at the ends of the tubes.

Other forms of external connectors for tubes generally comprise sleeves into which the tubes may be inserted, the tubes and connector having holes therethrough which, when the holes are aligned, receive a screw, bolt or other fixing means. As with the waterpipe connectors, these connectors require special tooling to provide holes therethrough and, furthermore, the tubes to be connected must have corresponding holes through the tubes.

All connectors which fix tubes internally comprise shaped projections which fit snugly within tubes to be connected. Some comprise male screw-threads on the outer surface of the projections, which male screw-threads are adapted to be screwed onto female screw-threads machined on the inside of the tubes. This necessarily means machining of the tubes to form the framework.

Other internal connectors known at present are fitted by means of adhesives or are knocked or driven into the insides of the tubes. Such methods are relatively permanent and the connectors are only releasable with a great deal of difficulty, thus making the completed frames difficult to dismantle and reassemble elsewhere.

It is an object of the present invention to overcome or at least mitigate some of the above mentioned disadvantages of the prior art.

According to the present invention there is provided a method of releasably securing a connector within a hollow tube, the connector comprising a screw member which screw member comprises a head and a threaded stem, a resiliently deformable member about the threaded stem and a nut member on the threaded stem, the resiliently deformable member being positioned between the head and the nut member, the method comprising inserting the threaded stem of the connector into the bore of the tube and rotating the screw member with respect to the nut member so that the nut member is threaded towards the head, thereby to compress the resiliently deformable member so that the connector is secured to the hollow tube.

In one embodiment of the present invention, the resiliently deformable member comprises rubber.

Preferably, the connector comprises a groove for receiving a screwdriver or suitable implement which may be used to rotate the screw member.

In one embodiment of the present invention, the body extends behind the head of the screw member in the opposite direction to the threaded stem of the screw member. Preferably, the body is contiguous with the resiliently deformable member. In a further embodiment of the present invention, the body is separate from the resiliently deformable member and preferably the body comprises metal.

The present invention also envisages the use of two or more connectors attached to a single body, preferably extending from that body at angles to each other. A preferred aspect of this embodiment comprises a plurality of individual connectors which are releasably secured to a central body.

In yet a further embodiment of the present invention, the connector comprises two opposing screw members, the threaded stems of which have opposing threads, the heads of the two screw members being connected by a member, such as a plate, so that rotation of the plate causes both screws to turn to move the respective nut members in the same direction relative to each screw member.

According to a further aspect of the present invention there is provided a connector for use in the method of the present invention.

In order that the invention may be more readily understood and so that further features thereof may be appreciated, embodiments of the invention will now be described, by way of example, with reference to the accompanying drawings, in which.

Figure 1:
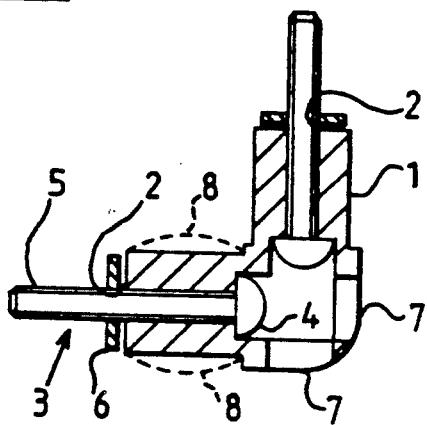
FIG. 1 shows a schematic semi-sectional view of one embodiment of the present invention.

The embodiment of the present invention shown in FIG. 1 comprises a resilient body 1 having screw holes 2 drilled therethrough at right angles to each other. Within each of the screw holes 2 is positioned a screw 3 having a head 4 and a threaded stem 5. Threaded onto each threaded stem 5 is a washer 6. The body 1 further comprises operating holes 7 which are positioned within the body 1 so as to allow access to the head 4 of the screw 3 by means of a screwdriver or other suitable implement.

To operate the connector of FIG. 1, a screwdriver or similar article may be placed through an operating hole 7 and inserted into an appropriate groove in the head 4 of a screw 3. By this means, screw 3 may be rotated appropriately so as to thread the washer 6 along the threaded stem 5 towards the head 4 of the screw 3. In so doing, the resilient body 1 will be compressed between the head 4 of the screw 3 and the washer 6, as the washer 6 moves towards the head 4. Accordingly, the resilient body 1 will compensate for the force placed thereupon, by the washer 6 and the head 4, by bulging away from the threaded stem 5 as shown by dotted lines 8. When the connector of FIG. 1 is in place inside a tube, the compression of the resilient body 1 will cause the resilient body 1 to bulge outwardly and so contact the inner face of the tube within which the connector is positioned, thus establishing a friction grip between the resilient body 1 and the interior of the tube. In this way the connector may grip the tube and so be secured therein.

To release the connector from a tube, a screwdriver or similar implement is merely inserted through an operating hole 7 to rest in the appropriate groove in the head 4 so that the screw 3 may be rotated in the direction such that the washer 6 is threaded along the threaded stem 5 away from the head 4. This releases the compression force upon the body 1 of the connector and thus the resilient body 1 returns to the original shape of the body 1, (as shown by solid lines in FIG. 1) so ceasing to bulge and thus releasing the friction grip of the body 1 upon the interior of the tube in which the body 1 is positioned.

Figure 2:
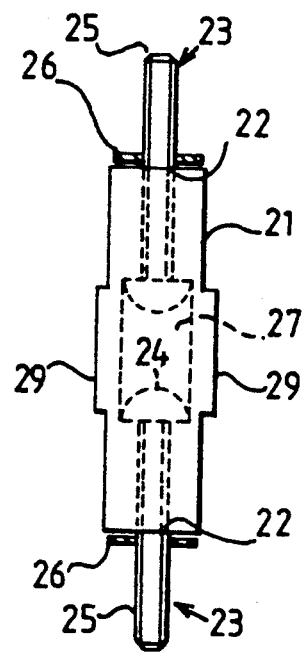
FIG. 2 shows a plan view of a second embodiment of the present invention.

FIG. 2 shows an alternative embodiment of the connector in FIG. 1 wherein the body 21 is linear and the screws 23 are positioned in screw holes 22 which extend through opposite ends of the body 21. The operating hole 27 is in the form of a trench cut in the side of the body 21. The body further comprises two bulges 29 at the centre of the body 21, which bulges 29 prevent the connector from accidentally slipping totally inside a tube within which it is positioned. As can be seen from FIG. 3 the bulges 29 extend beyond the internal diameter of a tube in which the connector is to be inserted.

Figure 3:
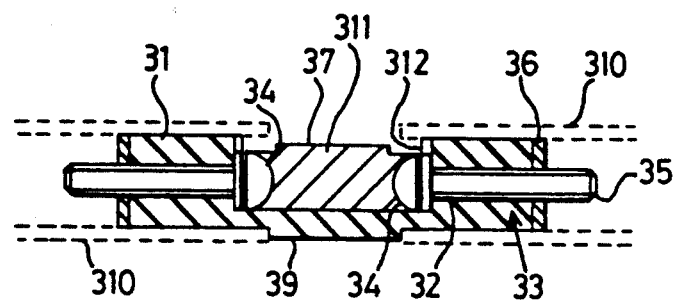
FIG. 3 shows a transverse semi-sectional schematic view of a third embodiment of the present invention.

FIG. 3 shows a third embodiment of the invention shown in FIG. 1, connecting two tubes 310.

It can be seen from FIG. 3 that the connector is linear and comprises two screw holes 32 positioned in either end of the resilient body 31. The operating hole 37 comprises a trench cut in the resilient body 31, and, positioned between the two heads 34 of the respective screws 33 of the connector, is a plate 311. The plate 311 is located in the grooves of both heads 34 of respective screws 33. The threads of the respective threaded members 35 of the two screws 33 are opposed and, accordingly, the threads of the two washers 36 thereon are similarly opposed. Positioned between the head 34 of the screws 33 and those parts of the resilient body 31 to be compressed by the screw 33 and the washer 36 is a second washer 312 which merely serves to give support to the entire part of the resilient body 31 which is to be compressed, thus allowing the part of that body 31 which is to be compressed to have a diameter greater than the head 34 of the screw 33.

To operate the connector of FIG. 3, tubes 310 are placed over either end of the connector body 31. The tubes 310 are prevented from slipping too far up the connector by the bulge 39 in the middle of the body 31. When the connector is in position the plate 311 is rotated about the axis of the two screws 33 thus rotating the two screws 33. This rotation of the plate 311 may be achieved by means of a screwdriver, or similar implement, inserted into the operating trench 37. The rotation of the screws 33 causes the respective washers 36 to be threaded along the respective threaded stems 35 towards the heads 34 of the screws 33. Both washers 36 move towards the respective heads 34 because of the opposing threads of the two screws 33, thus ensuring that rotation of both screws 33 in the same direction will result in movement of the washers 36 along the threaded stems 35 in the same direction relative to each screw 33. As the washers 36 move towards the heads 34 of the screws 33 the resilient body 31 is compressed between the washer 312 and the washer 36. To compensate for the force of this compression the resilient body 31 expands outwardly towards the inner surface of the tubes 310 and thus, when contacting the inner surface of the tubes 310 establishes a friction grip therewith, thus holding the resilient body 31 within the tubes 310.

To remove the connector from the tubes 310 the plate 311 is merely rotated in the opposite direction, thus moving the washers 36 away from the heads 34 of the screws 33 and so releasing compression forces acting upon the resilient body 31 between the washers 36 and 312. This causes the resilient body 31 to return to the original shape of the resilient body 31 and thus releases the friction grip of the connector upon the inner surface of the tubes 310, thus allowing the tubes 310 to be slid off the connector of FIG. 3. The plate 311 of the connector of FIG. 3 is optional and, in the event that no such plate is present, the operating hole 37 is positioned to allow access to the screws 33 by a screwdriver or other suitable implement to allow the screws 33 to be rotated independently.

Figure 4:
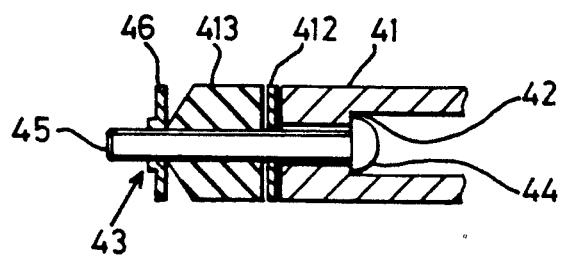
FIG. 4 shows a semi-sectional schematic view of a fourth embodiment of the present invention.

FIG. 4 shows a further embodiment of the present invention. This embodiment comprises a solid body 41 through which is located a hole 42 for screw 43, which screw 43 comprises a head 44 and a threaded stem 45. Threaded on the threaded stem 45 is a washer 46 and, also located on the threaded stem 45, is a resilient plug 413, made of rubber. Located between the body 41 and the resilient plug 413, on the threaded stem 45, is a second washer 412. In the embodiment of FIG. 4 the connector operates in substantially the same manner as the connectors of FIGS. 1 to 3, but the only part of the connector that is compressed, and thus bulges outwards, is the plug 413, which is compressed between the washer 46 and the washer 412. The embodiment of FIG. 4 allows the friction grip to be exerted upon the interior of a tube further within the tube than may be exerted by the embodiments of FIGS. 1 to 3, because the resilient plug 413 and the body 41 of the connector in FIG. 4 are not one and the same. This friction grip exerted further within the tube gives a more secure grip than the grip exerted by the embodiments shown in FIGS. 1 to 3.

Figure 5:
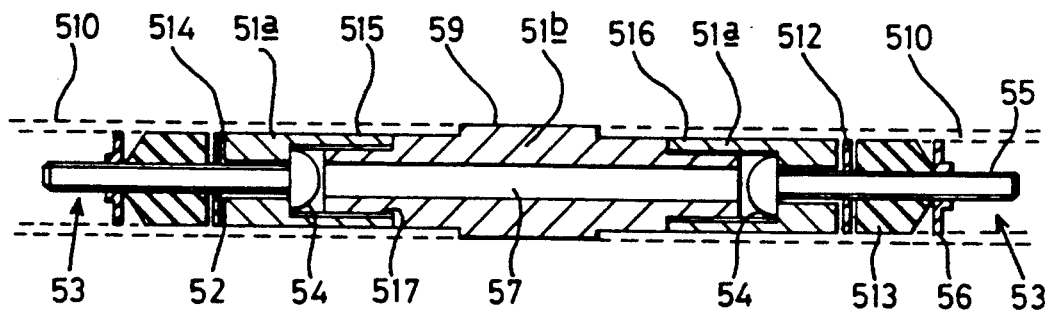
FIG. 5 shows a semi-sectional schematic view of a fifth embodiment of the present invention.

FIG. 5 shows an alternative embodiment of FIG. 4. In FIG. 5 the body 51 of the connector comprises three solid parts, two parts 51a associated with the two screws 53 and a central body portion 51b. The portions 51a comprise a base plate 514, through which a screw hole 52 extends, and a cylindrical projection 515 extending away from the outer edge of the base plate 514. A screw 53 is positioned within a portion 51a such that the head 54 of the screw 53 is positioned within the cylindrical projection 515. The body 51b is, in FIG. 5, a substantially cylindrical body, having a bulge 59 in its centre to prevent the tubes 510 from slipping thereover and having threaded cylindrical indents 516 at either end of the body portion 51b. The threads on the indents 516 correspond to threads 517 located on the interior of the cylindrical projection 515 of the body portion 51a. In this way the body portion 51a may be connected to the body portion 51b so as to form a complete body 51. By this means a series of differently shaped central portion 51b may be manufactured to correspond with the end portions 51a such that a variety of differently shaped connectors may be formed using different shaped portions 51b and the same end portions 51a, thus allowing the user to connect many tubes together at a variety of different angles, which angles the user may choose themselves.

When the embodiment in FIG. 5 is used, the end portions 51a are screwed to the central portion 51b and the connector is then inserted into the tubes 510. A screwdriver may be inserted into the operating trench 57 of the central portion 51b to insert the screwdriver into appropriate grooves in the heads portions 54 of the screws 53. The connectors of FIG. 5 are operated in the same manner as the connectors of FIG. 4.

A further embodiment of the present invention is envisaged wherein the end portions 61a may be inserted into tubes, the screw 63 rotated so that the washer 66 comprises the resilient member 613 between the washer 66 and the washer 612 so as to establish a friction grip on the inner surface of the tube 610. In this embodiment, only after the friction grip of resilient member 613 has been established on the inner surface of the tube 610 will the central portion 61b be affixed to the end portion 61a. In such an embodiment the central portion 61b need have no operating hole or trench 67 cut into the central portion 61b.

Figure 6:
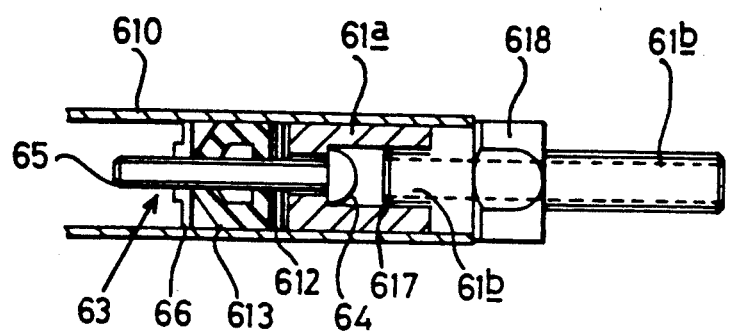
FIG. 6 shows a semi-sectional schematic view of a sixth embodiment of the present invention.

Such an embodiment is shown in FIG. 6, wherein the central portion 61b merely comprises a solid metal tube having a screw thread at either end and a stop portion 618 in the centre thereof. In the embodiment shown in FIG. 6 the screw 63 is rotated, prior to insertion into the tube 610, to a point where the washer 66 has moved up the threaded stem 65 a sufficient distance to compress the resilient member 613 to an extent that, when the end portion 61a is inserted into the tube 610, the end portion 61a and the resilient member 613 will still move therealong, but a friction grip is established between the resilient member 613 and the inner surface of the tube 610 to prevent the end portion 61a from merely sliding into the interior of the tube 610. When the end portion 61a is in the required position within the tube 610, the screw 63 is rotated further so as to increase the compressive force of the washers 66 and 612 upon the resilient member 613 and thus increase the friction grip of the resilient member 613 on the inner surface of tube 610. This process secures the end portion 61a in position with respect to the tube 610. When the end portion 61a is secured in relation to the tube 610, the central body 61b may be attached to the end portion 61a by means of the threaded portion 616 of the central body 61b being screwed into the threaded portion 617 of the end portion 61a. A similar arrangement may be made with respect to the threaded portion 616a at the opposite end of the central body 61b of FIG. 6.

Figure 7:
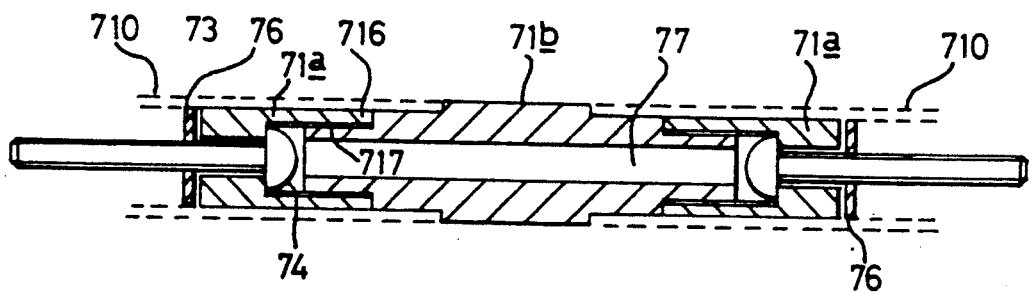
FIG. 7 shows a semi-sectional schematic view of a seventh embodiment of the present invention.

FIG. 7 shows a further embodiment of the present invention wherein the features of FIGS. 1 to 3 are combined with the features of FIGS. 5 and 6. In the embodiment of the present invention shown in FIG. 7, a connector is located in tubes 710. The connector comprises three body portions, two resilient end portions 71a and a solid central portion 71b. In the embodiment shown in FIG. 7, the end portions 71a, being resilient, are compressed between the head 74 of the screw 73 and the washer 76 so as to establish a friction grip on the inside of the tube. Thus no resilient member 613 is employed. In all other aspects the embodiment of FIG. 7 is similar to the embodiment of FIG. 5.

I claim:

1. A method of releasably securing a connector within a hollow tube, the connector comprising a screw member, which screw member comprises a head and a threaded stem, a resiliently deformable member about the threaded stem and a nut member on the threaded stem, the resiliently deformable member being positioned between the head and the nut member, a further screw member comprising a head and a threaded stem, a further resiliently deformable member about the further threaded stem, and a further nut member on the further threaded stem, a linear body receiving the screw members and extending beyond the heads of the screw members in substantially the opposite direction to the threaded stems of the screw members and in axial alignment therewith, and means comprising an elongated trench of channel shaped cross-section having end walls in the side of the body and receiving at least one of the heads, for allowing access to at least one head, the method comprising inserting a threaded stem of the connector into the bore of the tube and rotating the screw member with respect to the nut member so that the nut member is threaded towards the head, thereby to compress the resiliently deformable member so that the connector is secured to the hollow tube.

2. A method as claimed in claim 1, wherein the resilient member comprises rubber.

3. A method according to claim 1, wherein the trench is for receiving screwdriver or suitable implement for rotating the screw member.

4. A method according to any one of claim 1, wherein the body is contiguous with the resiliently deformable member.

5. A method according to any one of claim 1, wherein the body is separately formed from the resiliently deformable member.

6. A method according to claim 5, wherein the body comprises metal.

7. A method according to any one of claim 1, wherein the body of the connector is further connectable to a central body.

8. A method according to claim 7, wherein the central body is adapted so as to be attached to a plurality of connectors.

9. A method according to claim 1, wherein the screw members extend away from each other along a common axis, the threaded stems of the screw members having opposing threads, and the heads of the two screw members are connected by a member so that rotation of the member causes both screws to turn to move the respective nut members in the same direction relative to each respective screw member.

10. A method according to claim 9, wherein the member is a plate.

11. A method of releasably securing a connector within a hollow tube, the connector comprising a screw member, which screw member comprises a head and a threaded stem, a resiliently deformable member about the threaded steam and a nut member on the threaded stem, the resiliently deformable member being positioned between the head and the nut member, a further screw member comprising a head and a threaded stem, a further resiliently deformable member about the further threaded stem, and a further nut member on the further threaded stem, the screw members extending away from each other along a common axis, the threaded stems of the screw members having opposite threads and the heads of the two screw members bieng connected by a member so that rotation of the member causes both screws to turn to move the respective nut members in the same direction relative to each respective screw member, a body extending beyond the heads of the screw members in substantially the opposite direction to the threaded stems of the screw members, the method comprising inserting a threaded stem of the connector into the bore of the tube and rotating the respective screw member thereof with respect to the respective nut member so that the nut member is threaded towards the respective head, thereby to compress the resiliently deformable member so that the connector is secured to the hollow tube.

12. The method according to claim 11, wherein the member is a plate.

* * * * *